United States Patent
Nagpal et al.

(10) Patent No.: US 12,311,855 B2
(45) Date of Patent: May 27, 2025

(54) CORRECTING A MISMATCHED USER PROFILE FOR VEHICLE SETTINGS

(71) Applicants: Toyota Motor North America, Inc., Plano, TX (US); Toyota Jidosha Kabushiki Kaisha, Toyota Aichi-ken (JP)

(72) Inventors: Anil Nagpal, Plano, TX (US); Yuho Kozu, Dallas, TX (US); Nitesh Kumar, Plano, TX (US); Masanori Kushibe, Toyota (JP); Tomonari Yamaguchi, Toyota (JP)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 388 days.

(21) Appl. No.: 17/161,750

(22) Filed: Jan. 29, 2021

(65) Prior Publication Data

US 2022/0242342 A1   Aug. 4, 2022

(51) Int. Cl.
*B60R 16/037* (2006.01)
*H04M 1/72412* (2021.01)
*H04W 4/40* (2018.01)

(52) U.S. Cl.
CPC ....... *B60R 16/037* (2013.01); *H04M 1/72412* (2021.01); *H04W 4/40* (2018.02)

(58) Field of Classification Search
CPC .... B60R 16/037; H04W 4/40; H04M 1/72412
See application file for complete search history.

(56) References Cited

U.S. PATENT DOCUMENTS

| | | |
|---|---|---|
| 6,505,780 B1 | 1/2003 | Yassin et al. |
| 8,370,030 B1 | 2/2013 | Gurin |
| 8,977,408 B1 | 3/2015 | Cazanas et al. |
| 9,248,794 B2 | 2/2016 | Chang et al. |
| 9,401,845 B2 | 7/2016 | Cazanas et al. |
| 2004/0054918 A1* | 3/2004 | Duri ..................... G06Q 20/382 705/64 |
| 2004/0093154 A1 | 5/2004 | Simonds et al. |
| 2007/0238491 A1 | 10/2007 | He |
| 2008/0275604 A1 | 11/2008 | Perry et al. |
| 2010/0097178 A1 | 4/2010 | Pisz |
| 2013/0073672 A1* | 3/2013 | Ayed ........................ G06F 8/61 709/217 |
| 2014/0229060 A1* | 8/2014 | MacNeille ......... G06Q 30/0255 701/36 |
| 2014/0380505 A1* | 12/2014 | Camacho ................ G06F 21/31 726/28 |

(Continued)

FOREIGN PATENT DOCUMENTS

WO     2019209370 A1    10/2019

*Primary Examiner* — Kito R Robinson
*Assistant Examiner* — Roy Rhee
(74) *Attorney, Agent, or Firm* — Dinsmore & Shohl LLP

(57) ABSTRACT

A vehicle system for a vehicle includes a controller configured to: identify a user profile to be loaded based on communication with a user device; receive user preference packets containing a user ID from the user device; determine whether the user ID of the user preference packets matches with a user ID of the user profile to be loaded; and discard the user preference packets in response to determining that the user ID of the user preference packets does not match with the user ID of the user profile to be loaded.

20 Claims, 4 Drawing Sheets

(56) References Cited

U.S. PATENT DOCUMENTS

| | | |
|---|---|---|
| 2015/0363986 A1* | 12/2015 | Hoyos ................ G07C 9/00571 |
| | | 340/5.61 |
| 2016/0129916 A1* | 5/2016 | Olsen .................... B60R 16/037 |
| | | 701/36 |
| 2017/0080949 A1 | 3/2017 | Sinaguinan |
| 2017/0232914 A1* | 8/2017 | Brenner ................ B60R 16/037 |
| | | 701/36 |
| 2018/0208204 A1 | 7/2018 | Chen |
| 2018/0285463 A1 | 10/2018 | Choi et al. |
| 2019/0392107 A1 | 12/2019 | Ricci |
| 2021/0293075 A1* | 9/2021 | Oesterling ............. G06Q 50/30 |

* cited by examiner

CORRECTING A MISMATCHED USER PROFILE FOR VEHICLE SETTINGS

TECHNICAL FIELD

The present specification generally relates to systems and methods for automatically adjusting various settings of a vehicle and, more specifically, to systems and methods for automatically adjusting various settings of a vehicle using an identified Bluetooth device of an associated user.

BACKGROUND

Vehicles may have a number of settings that vehicle users may adjust based on their personal preferences. These settings may include, for example, seat positions, mirror positions, pedal positions, radio station presets, heating and air conditioning settings, navigation settings, voice settings, audio settings, search settings, subscription status, screen configurations, and the like. A vehicle may store parameters for one or more of these settings in a user profile associated with a user. Then, when the user enters a vehicle, the vehicle settings may be automatically adjusted to the user's preferences based on the user profile. Thus, a user need not manually adjust these settings each time he or she enters the vehicle.

If multiple users (e.g., passengers, drivers, etc.) use a particular vehicle, the vehicle may store a user profile for each such user. As such, when a particular user operates or otherwise uses the vehicle, it may be desirable for the vehicle to load a user profile associated with that user and automatically adjust the vehicle settings according to the user profile of that user. A vehicle may detect a particular user by associating the user with a smart device of the user and detecting the device.

That is, when a user enters a vehicle, the vehicle may detect a smart device (e.g., a smartphone, smart watch, or other device) carried by the user. The vehicle may identify the user, for example, based on a detected mobile device associated with the user and may automatically load a user profile associated with that user. This may increase the convenience of the user by obviating the need for the user to manually select his or her user profile. However, multiple users may be associated with either a single device and/or a single vehicle. If a vehicle detects a device that is not carried by the user to which the device is associated, the vehicle may improperly adjust settings for the associated user rather than the user actually carrying the device. Accordingly, systems and methods for preventing an incorrect user profile from being loaded and discarding user preference packets associated with an incorrectly loaded profile may be required.

SUMMARY

In one embodiment, a vehicle system for a vehicle includes a controller configured to: identify a user profile to be loaded based on communication with a user device; receive user preference packets containing a user ID from the user device; determine whether the user ID of the user preference packets matches with a user ID of the user profile to be loaded; and discard the user preference packets in response to determining that the user ID of the user preference packets does not match with the user ID of the user profile to be loaded.

In another embodiment, a method includes identifying a user profile to be loaded based on communication with a user device; receiving user preference packets containing a user ID from the user device; determining whether the user ID of the user preference packets matches with a user ID of the user profile to be loaded; and discarding the user preference packets in response to determining that the user ID of the user preference packets does not match with the user ID of the user profile to be loaded.

In yet another embodiment, a vehicle system for a vehicle includes: a controller configured to: identify a user profile to be loaded based on communication with a user device; receive one or more user preference packets containing a user ID from the user device; determine whether the user ID of the user preference packets matches with a user ID of the user profile to be loaded; and store the user preference packets in a temporary storage in response to determining that the user ID of the user preference packets does not match with the user ID of the user profile to be loaded.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are generally directed to vehicles and systems for correcting a mismatched user profile that may be incorrectly loaded to a head unit of a vehicle or similar device. In embodiments, a vehicle system may acquire a user profile based on a Bluetooth signal (e.g., the head unit may connect to the Bluetooth device using Bluetooth SPP (Serial Port Profile) or Bluetooth Low Energy (BLE) or hands-free protocol ("HFP")) from a Bluetooth-enabled device. The vehicle system may have one or more user profiles stored locally (e.g., in a memory module of the head unit) and may have a device ID or other identifying characteristics of the device associated with the user profile, such that upon detection of the Bluetooth-enabled device, the head unit may prepare the user profile associated with the device ID to be loaded. In some embodiments, the head unit may acquire user profile packets from the Bluetooth-enabled device and may, for example, decrypt a metadata packet of the acquired user profile and extract one or more parameters in the packet to determine the device ID (and consequently the profile to be loaded).

After the head unit identifies a profile to be loaded via the Bluetooth device, the head unit may attempt to request user preference packets from an App (e.g., Toyota App) of the Bluetooth device, e.g., via BT-BLE, BT-SPP, and the like. If the user preference packets are transferred successfully from the App of the Bluetooth device to the head unit, the head unit may verify that the User ID within the user preference packets is matching with the User ID of the profile to be loaded. For example, the head unit may perform user ID matching between the user ID within the first packet of the user preference packets and the user ID of the profile to be loaded before opening up the second packet. In case the User ID within the first packet does not match the user ID of the profile to be loaded, the head unit may discard the received user preference packets for that user. This may prevent services and data associated with the user ID and/or the profile stored in the App from being improperly loaded to the head unit, which may further prevent unauthorized data transfer or other settings alterations associated with loading of the improper profile. For example, subscription services (e.g., video streaming, etc.) which may be assigned to the vehicle based on loading the profile to be loaded will not be assigned to the vehicle. Further, other vehicle settings associated with the profile to be loaded will not be set to the vehicle.

Figure 1:
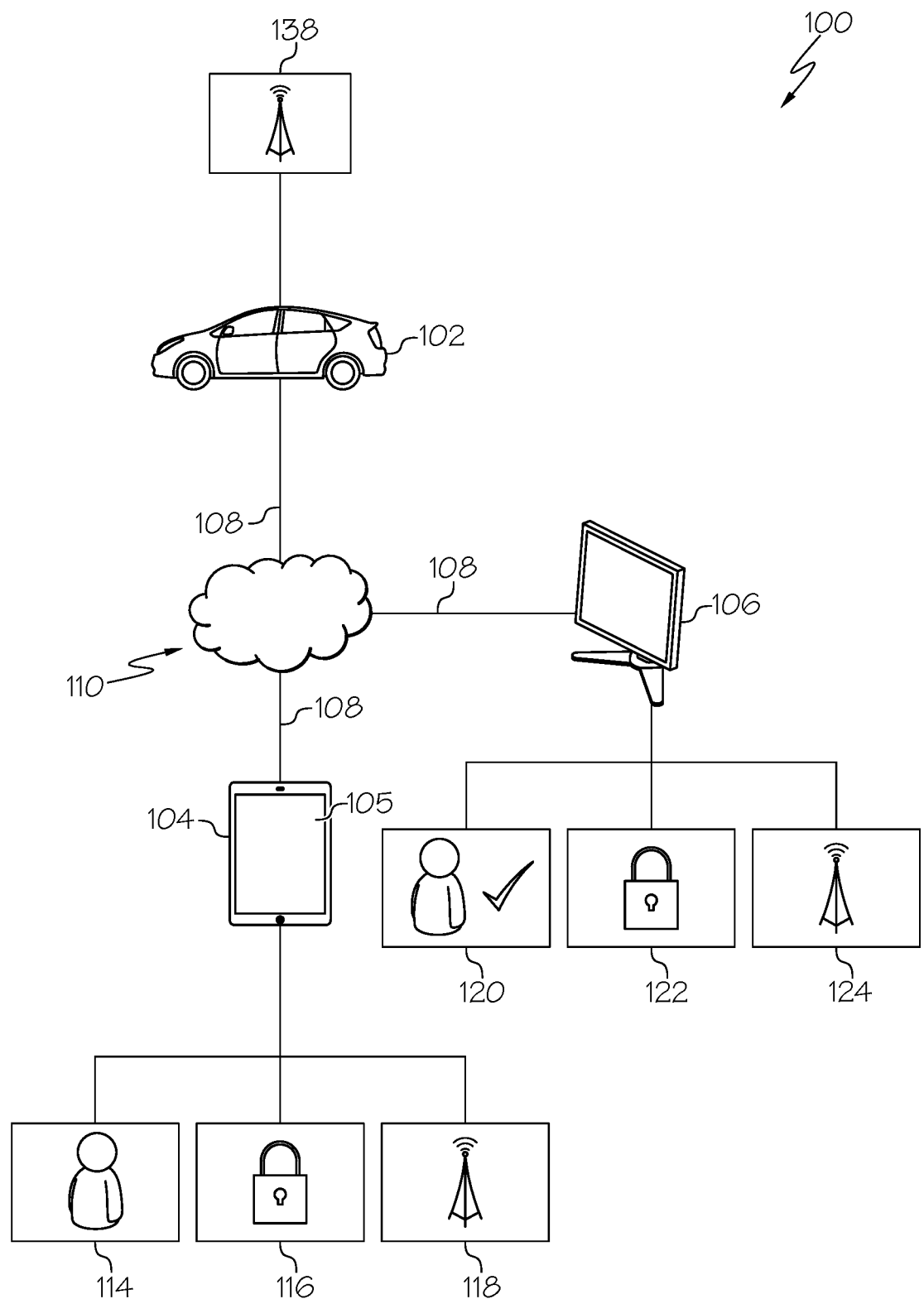
FIG. 1 depicts a system for discarding user preference packets in response to determining that a user ID of the user preference packets does not match with a user ID of a user profile to be loaded, according to one or more embodiments shown and described herein.

Referring now to FIG. 1, a system 100 for discarding user preference packets in response to determining that a user ID of the user preference packets does not match with a user ID of a user profile to be loaded is shown. FIG. 1 shows the system 100 including a vehicle 102, a device 104, which may include an interactive display 105, and a controller 106. In some embodiments, the controller 106 may be disposed within and/or communicatively connected to the vehicle 102. For example, the controller 106 may be communicatively connected to a head unit (not shown) of the vehicle 102. The vehicle 102, the device 104, and the controller 106 may be communicatively coupled via a communication path 108. The communication path 108 may communicatively couple the vehicle 102, the device 104, and the controller 106 to, for example, a network 110. The vehicle 102 may include network interface hardware 138. The device 104 may include the profile module 114, the encryption/decryption module 116, and network interface hardware 118. The controller 106 may comprise a profile module 120, an encryption/decryption module 122, and network interface hardware 124.

Each of the profile module 114, the encryption/decryption module 116, the profile module 120, the encryption/decryption module 122, and the network interface hardware 124 may be a program module in the form of operating systems, application program modules, and other program modules stored in the controller 106, the device 104, or the vehicle 102. Such a program module may include, but is not limited to, routines, subroutines, programs, objects, components, data structures and the like for performing specific tasks or executing specific data types as will be described below.

Still referring to FIG. 1, the vehicle 102 may comprise the network interface hardware 138. The vehicle 102 may be, for example, an individually-owned vehicle, a vehicle in a car share or car rental service, or any other vehicle that is capable of storing and loading files associated with one or more user profiles using, for example, one or more of the communicatively coupled modules and/or components described herein.

The network interface hardware 138 may communicatively couple the vehicle 102 to the communication path 108. The network interface hardware 138 may be any device capable of transmitting and/or receiving data with external devices, vehicles, or servers directly or via a network, such as the network 110. Accordingly, network interface hardware 138 can include a communication transceiver for sending and/or receiving any wired or wireless communication. For example, the network interface hardware 138 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 138 may include hardware configured to operate in accordance with the Bluetooth wireless communication protocol and may include a Bluetooth send/receive module for sending and receiving Bluetooth communications. For example, the network interface hardware 138 may be configured to operate using one or more of a Bluetooth Low Energy (BLE) protocol, a Bluetooth Serial Port Profile (SPP) protocol, a Bluetooth Handsfree Protocol (HFP), and/or one or more other Bluetooth protocols.

The device 104 may comprise the profile module 114, the encryption/decryption module 116, and network interface hardware 118. The device 104 may be, for example, a portable input/output device (e.g., a smartphone, smart key fob, or digital key fob) including the interactive display 105 (e.g., a touchscreen or tactile display). The interactive display 105 may comprise any known or yet-to-be-developed display, such as LCD, LED, plasma, OLED, CRT, projection, holographic, electronic paper, or any other type of suitable output display. If provided as a tactile display, the interactive display 105 may be any device capable of providing tactile output in the form of refreshable tactile messages. In some embodiments, the device 104 does not include a display, for example, in embodiments in which the device 104 is a display-less key fob that is capable of transmitting and receiving a signal. The device 104 may be generally associated with an individual user. For example, the device 104 may be generally in the possession of a particular user of the vehicle 102 such that the presence of the device 104 generally indicates the presence of the user.

The profile module 114 may save information on the device 104 related to a profile of a user of the device 104. In some embodiments, the profile module 114 stores a private key of the user for use with the encryption/decryption module 122. The profile module 114 may store historical data associated with a user profile such as, for example, a location history, a vehicle preference history that may include information such as, for example, a preference for a particular make, model, size, class, or other vehicle characteristics. In some embodiments, the profile module 114 may update a user profile based on information relating to a selected vehicle that is selected from a plurality of vehicles. The profile module 114 may include a name, age, gender, or other classifying information associated with a user. In some embodiments, the profile module 114 may store, for example, an image of the user. The profile module 114 may store one or more credentials of a user, for example, the profile module 114 may store a driver's license number or image of a user's driver's license in order to verify that the user is licensed to operate a vehicle. In some embodiments, the profile information of the user may be stored in one or more user profile packets and such packets may include data about the user profile (e.g., metadata).

The encryption/decryption module 116 may generate a signal with a private key or a session key that creates an encrypted signal that can only be decrypted using an associated public key. Because the private key is only known by the sender, a receiver of the signal who can successfully decrypt the signal using the associated public key can be confident that the signal came from the owner of the private key, in this case, the controller 106. The encryption/decryption module 116 may encrypt and decrypt information related to the user preference packets, for example.

Additionally, the encryption/decryption module 116 may store the public keys of the device 104 and/or the controller 106 and may decrypt received signals using the public keys of the device 104 and/or the controller 106. Because the encrypted messages received from the device 104 and the controller 106 are encrypted using their respective private keys and the private keys are held secretly, such signals cannot be decrypted by any other entity if the signals are intercepted. In some embodiments, the encryption/decryption module may decrypt signals received from the device 104 and/or the controller 106 with a session key once a secure or semi-secure session key has been established.

In some embodiments, the encryption/decryption module 116 may apply a hash function to a signal and sign the resulting hash, rather than signing the signal itself. In such embodiments the signed hash is transmitted along with the signal to be verified. Then, when the signal is received along with the signed hash, the signed hash may be read using the server public key and the hash function used. The results may then be compared to verify the authenticity. This method of signing only a hash of a signal rather than the entire signal may reduce data transfer, thereby increasing computational efficiency.

In the embodiments where the encryption/decryption module 116 signs hashes as discussed above, the profile module 114 or another component of the system 100 may use a device public key to read a signed hash and then apply the hash function to the result to verify the sender of a message.

In some embodiments, the encryption/decryption module 116 may randomly generate or receive a randomly-generated session key to be used by the controller 106, the device 104, and the vehicle 102 to encrypt communications between them while a more secure communications protocol is established. In some embodiments, the encryption/decryption module 116 may randomly generate or receive a randomly-generated session key that is only used to encrypt messages for one communications session.

The controller 106 may include, for example, one or more processors and one or more memory modules storing one or more machine-readable instructions. The one or more processors may include any device capable of executing machine-readable instructions. Accordingly, the one or more processors may be a controller, an integrated circuit, a microchip, a computer, or any other computing device. The one or more processors and the one or more memory modules may be communicatively coupled to the other components of the system 100 by the communication path 108. The controller 106 may comprise the profile module 120, the encryption/decryption module 122, and the network interface hardware 124.

The profile module 120 may store the user preference packets or information related to the user preference packets. The profile module 120 may save information on the controller 106 related to a profile of a user of the device 104. In some embodiments, the profile module 120 stores a private key of the user for use with the encryption/decryption module 122. The profile module 120 may store historical data associated with a user profile such as, for example, a location history, a vehicle preference history that may include information such as, for example, a preference for a particular make, model, size, class, or other vehicle characteristics. In some embodiments, the profile module 120 may update a user profile based on information relating to a selected vehicle that is selected from a plurality of vehicles as described in greater detail herein. The profile module 120 may include a name, age, gender, or other classifying information associated with a user. In some embodiments, the profile module 120 may store, for example, an image of the user. The profile module 120 may store one or more credentials of a user, for example, the profile module 120 may store a driver's license number or image of a user's driver's license in order to verify that the user is licensed to operate a vehicle.

The encryption/decryption module 122 may generate a signal with a private key or a session key that creates an encrypted signal that can only be decrypted using an associated public key. Because the private key is only known by the sender, a receiver of the signal who can successfully decrypt the signal using the associated public key can be confident that the signal came from the owner of the private key, in this case, the controller 106. The encryption/decryption module 122 may encrypt and decrypt information related to the user preference packets, for example.

Additionally, the encryption/decryption module 122 may store the public keys of the device 104 and/or the vehicle 102 and may decrypt received signals using the public keys of the device 104 and/or the vehicle 102. Because the encrypted messages received from the device 104 and the vehicle 102 are encrypted using their respective private keys and the private keys are held secretly, such signals cannot be decrypted by any other entity if the signals are intercepted. In some embodiments, the encryption/decryption module may decrypt signals received from the device 104 and/or the vehicle 102 with a session key once a secure or semi-secure session key has been established.

In some embodiments, the encryption/decryption module 122 may apply a hash function to a signal and sign the resulting hash, rather than signing the signal itself. In such embodiments the signed hash is transmitted along with the signal to be verified. Then, when the signal is received along with the signed hash, the signed hash may be read using the server public key and the hash function used. The results may then be compared to verify the authenticity. This method of signing only a hash of a signal rather than the entire signal may reduce data transfer, thereby increasing computational efficiency.

In the embodiments where the encryption/decryption module 122 signs hashes as discussed above, the profile module 120 or another component of the system 100 may use a device public key to read a signed hash and then apply the hash function to the result to verify the sender of a message.

In some embodiments, the encryption/decryption module 122 may randomly generate or receive a randomly-generated session key to be used by the controller 106, the device 104, and/or the vehicle 102 to encrypt communications between them while a more secure communications protocol is established. In some embodiments, the encryption/decryption module 122 may randomly generate or receive a randomly-generated session key that is only used to encrypt messages for one communications session.

The network interface hardware 124 may communicatively couple the controller 106 to the communication path 108. The network interface hardware 124 may be any device capable of transmitting and/or receiving data with external devices, vehicles, or servers directly or via a network, such as the network 110. Accordingly, network interface hardware 124 can include a communication transceiver for sending and/or receiving any wired or wireless communication. For example, the network interface hardware 124 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 124 may include hardware configured to operate in accordance with the Bluetooth wireless communication protocol and may include a Bluetooth send/receive module for sending and receiving Bluetooth communications. For example, the network interface hardware 124 may be configured to operate using one or more of a Bluetooth Low Energy (BLE) protocol, a Bluetooth Serial Port Profile (SPP) protocol, a Bluetooth Handsfree Protocol (HFP), and/or one or more other Bluetooth protocols.

Figure 2:
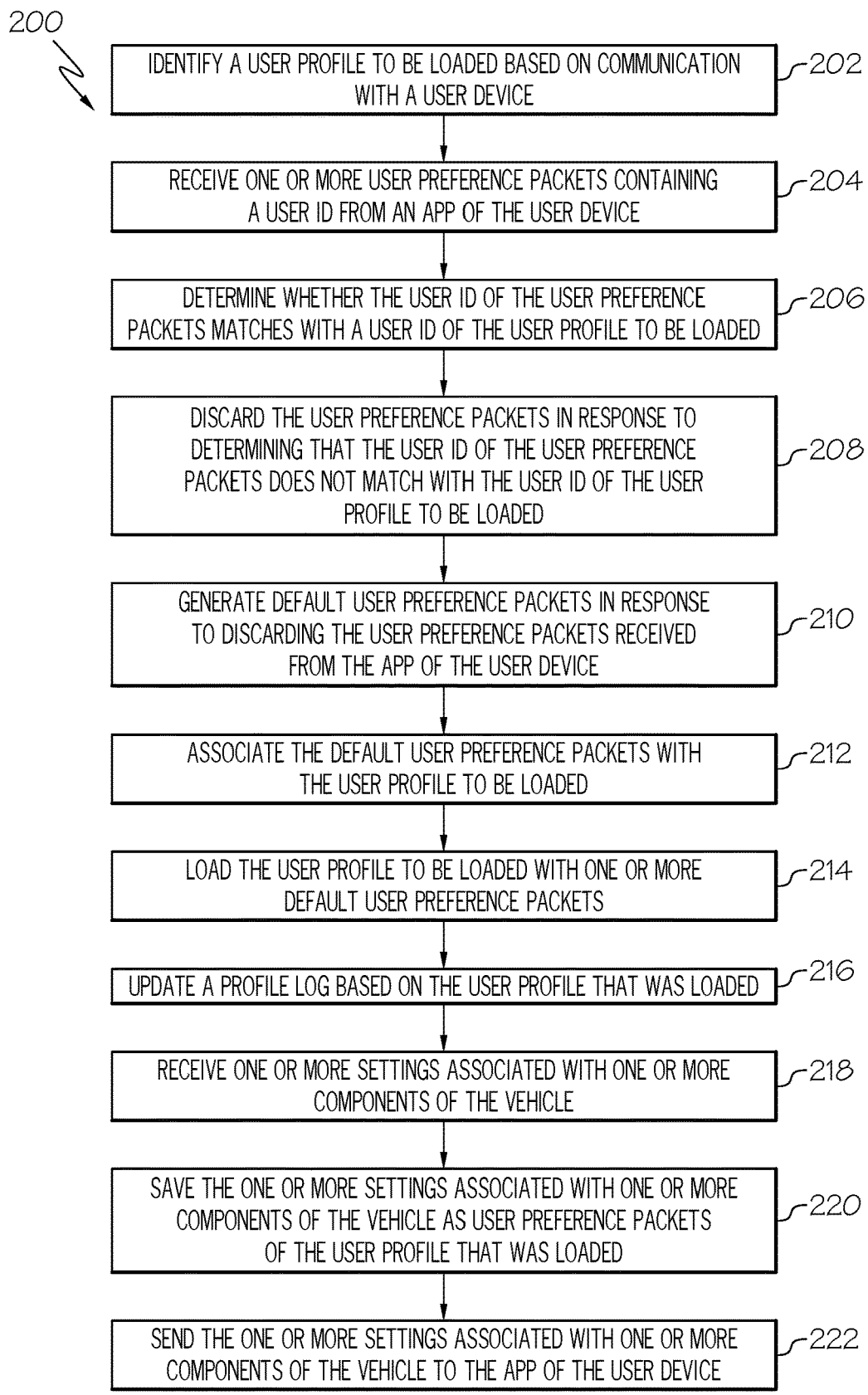
FIG. 2 depicts a method for discarding user preference packets in response to determining that a user ID of the user preference packets does not match with a user ID of a user profile to be loaded, according to one or more embodiments shown and described herein.

Referring now to FIGS. 1 and 2, a method 200 for discarding user preference packets in response to determining that a user ID of the user preference packets does not match with a user ID of the user profile is shown. The method 200 may be carried out using a vehicle system, such as the system 100 of FIG. 1, for example.

At step 202, the controller 106 may identify a user profile to be loaded based on communication with the device 104. The device 104 may be a device associated with a user of the system 100. For example, the device 104 may be a handheld or wearable device (e.g., smartphone, tablet, smartwatch, etc.) that may include network interface hardware 124. The user profile to be loaded may include a user ID that is associated with a particular user of the device 104 and may be stored on the controller 106.

The user profile to be loaded may be identified by a device ID that is carried by a signal received by the controller 106 or other identifying signal associated with the device. In some embodiments, the identifying signal may be encrypted. For example, the identifying signal may be encrypted using the encryption/decryption module 116 of the device 104 and may be decrypted by the controller 106 using the encryption/decryption module 122 as discussed in greater detail herein. The controller 106 may identify the device 104 and may associate the device with a user profile stored in one or more of the one or more memory modules of the controller 106, the device 104, and/or at a location on the network 110. The controller 106 may use the profile module 120, for example, to store and/or load the user profile. Before loading the user profile, one or more of the controller 106 and the device 104 may determine whether or not the user ID associated with the user profile to be loaded matches a user ID from the user preference packets as described in greater detail herein.

At step 204, the controller 106 may receive one or more user preference packets containing a user ID from an app of the user device. The user preference packets may include, for example, one or more vehicle settings related to, for example, seat positions, mirror positions, pedal positions, radio station presets, heating and air conditioning settings, navigation settings, voice settings, audio settings, search settings, subscription status, screen configurations, and the like that may be preferred by a user. The user preference packets may further include identifying information of a user (e.g., a user ID) that is used to reference the particular vehicle settings to a particular user in order to make the vehicle as customized to the particular user as possible. The identifying information may include, for example, a name, age, gender, or other classifying information associated with a user, an image or biometric data (e.g., voice recording, finger print, etc.) of the user, or one or more administrative or legal credentials of a user, for example, a driver's license number or image of a user's driver's license or other identification card. In some embodiments, the identifying information may be stored in the profile module 114. The user preference packets and other identifying information (e.g., the user ID) may be stored in an app on the device 104 and may be accessible by a user selecting the app using, for example, the interactive display 105.

At step 206, the controller 106 may determine whether the user ID of the user preference packets matches with a user ID of the user profile to be loaded. For example, the controller 106 may perform user ID matching between a user ID associated with a first group of user preference packets and the user ID of the user profile to be loaded that may have been determined based on the device identification discussed above.

At step 208, the controller 106 may discard the user preference packets in response to determining that the user ID of the user preference packets does not match with the user ID of the user profile to be loaded. For example, the user preference packets may be discarded into a file repository or marked for deletion or simply deleted. Accordingly, an incorrect user profile may not be loaded to the controller 106 and/or a head unit of the vehicle 102. Additionally, the vehicle settings data stored in the user preference packets will not be loaded to the vehicle 102 and the settings of the vehicle 102 will not be updated to those settings associated with the particular user ID (e.g., a seat position will not adjust to a preferred seat position associated with the user ID, the climate control system will not adjust the climate of the vehicle 102 to fit the preferred climate settings stored in the user preference packets, etc.). If the user ID of the user preference packets matches the user ID of the user profile to be loaded, the controller 106 may not discard the user preference packets, and the vehicle settings data stored in the user preference packets may be loaded to the vehicle 102. The settings of the vehicle 102 may be updated based on those settings in the user preference packets (e.g., a seat position may adjust to a preferred seat position stored in the user preference packets, the climate control system may adjust the climate of the vehicle 102 to fit the preferred climate settings stored in the user preference packets, etc.). In some embodiments, after the controller 106 discards the user preference packets in response to determining that the user ID of the user preference packets does not match with the user ID of the user profile to be loaded, the controller 106 may load the profile of the user identified in step 202 and may update vehicle settings based on the loaded profile of the user. For example, the profile stored locally in the vehicle may be loaded and the vehicle settings are updated based on the loaded profile.

At step 210, the controller 106 may generate one or more default user preference packets in response to discarding the user preference packets received from the app of the device 104. For example, the controller 106 may generate a default user preference packet that includes information related to a default seat position of the driver's seat. Other vehicle settings may be included in the one or more default user preference packets. For example, display settings, comfort control settings, seat positions, mirror positions, control system (e.g., steering wheel or pedal) positions, and other vehicle setting may be adjusted based on the default user preference packets. In some embodiments, the controller 106 may retrieve user preference settings of the user profile identified in step 202 in response to discarding the user preference packets received from the app of the device 104. For example, the user profile identified in step 202 may include user preference settings previously set by the user and locally stored in a vehicle. Then, the settings of the vehicle 102 may be updated from the vehicle based on the user preference settings of the user profile identified in step 202.

At step 212, the controller 106 may associate the default user preference packets with the user profile to be loaded. For example, the controller 106 may cause the default user preference packets to be assigned to the user profile to be loaded before loading the user profile such that when the user profile is loaded, the default user preference packets are used to update vehicle settings in the vehicle to default settings. For example, the default user preference packets are used to move a vehicle seat (e.g., a driver seat) to a default driver seat position.

At step 214, the controller 106 may load the user profile to be loaded, including the one or more default user preference packets. This may cause one or more vehicle settings to be updated to the default vehicle settings as described in greater detail herein. For example, a vehicle seat may shift to a default vehicle seat position as described in greater detail herein.

At step 216, the controller 106 may update a profile log based on the user profile that was loaded at step 214. The user profile log may be stored, for example, in the profile module 114. The user profile log may be a record of all user profiles loaded to the controller 106 (i.e., people who have used the vehicle 102). The profile log may save user profiles and user profile settings associated with one or more known devices such that the controller can automatically update vehicle settings to the preferred vehicle settings when a user enters the car. In some embodiments, the profile log may be stored in the network 110 and may be used to determine a user's or users' expected pattern of use of the vehicle 102.

At step 218, the controller 106 may receive one or more settings associated with one or more components of the vehicle 102. The settings associated with one or more components of the vehicle 102 may be, for example, a vehicle seat position, a temperature or other climate control setting, a mirror position, a control element (e.g., steering wheel, acceleration or brake pedal, etc.) position, or other setting.

At step 220, the controller 106 may save the one or more settings associated with one or more components of the vehicle as user preference packets of the user profile that was loaded. That is, the controller 106 may update or generate new user preference packets for the user profile that was loaded. This may allow the user to update his or her settings such that the next time the user utilizes the vehicle, the vehicle will automatically update the vehicle settings to the preferred vehicle settings based on the user's profile being loaded, saving the user the time and effort of manually entering or adjusting vehicle settings.

At step 222, the controller 106 may send the one or more settings associated with one or more components of the vehicle to the app of the user device. The controller 106 may send the one or more settings associated with the one or more components of the vehicle to the app of the user device using, for example, the network 110. The device 104 may then store the settings locally (e.g., in the app). Thus, the user can enter a second vehicle that is configured to communicate with the device 104 to receive and set vehicle settings based on the user's preferred settings without the second vehicle needing to connect to the network 110. That is, the one or more settings can be set in the second vehicle based on only the settings stored in the app (or in another location of the device 104).

Figure 3:
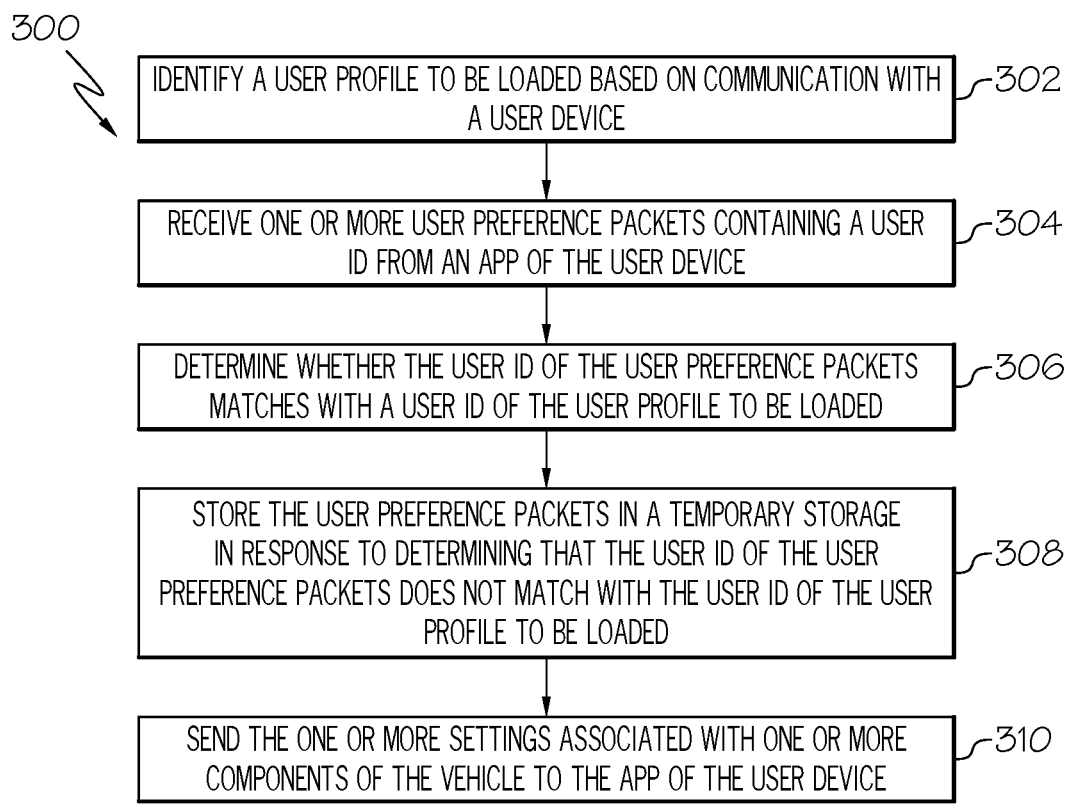
FIG. 3 depicts a method for storing user preference packets in a temporary storage in response to determining that a user ID of the user preference packets does not match with a user ID of a user profile to be loaded, according to one or more embodiments, shown and described herein.

Referring now to FIGS. 1 and 3, a method 300 for storing user preference packets in a temporary storage location in response to determining that a user ID of the user preference packets does not match with a user ID of a user profile to be loaded is shown. The method 300 may be carried out using, for example, the system 100 of FIG. 1.

At step 302, the controller 106 may identify a user profile to be loaded based on communication with the device 104. The user profile to be loaded may be identified by a device ID that is carried by a signal received by the controller 106 or other identifying signal associated with the device. In some embodiments, the identifying signal may be encrypted. For example, the identifying signal may be encrypted using the encryption/decryption module 116 of the device 104 and may be decrypted by the controller 106 using the encryption/decryption module 122 as discussed in greater detail herein. The controller 106 may identify the device 104 and may associate the device with a user profile stored in one or more of the one or more memory modules of the controller 106, the device 104, and/or at a location on the network 110. The controller 106 may use the profile module 120, for example, to store and/or load the user profile. Before loading the user profile, one or more of the controller 106 and the device 104 may determine whether or not the user ID associated with the user profile to be loaded matches a user ID from the user preference packets as described in greater detail herein.

At step 304, the controller 106 may receive one or more user preference packets containing a user ID from an app of the device 104. The user preference packets may include, for example, one or more vehicle settings related to, for example, seat positions, mirror positions, pedal positions, radio station presets, heating and air conditioning settings, navigation settings, voice settings, audio settings, search settings, subscription status, screen configurations, and the like that may be preferred by a user. The user preference packets may further include identifying information of a user (e.g., a user ID) that is used to reference the particular vehicle settings to a particular user in order to make the vehicle as customized to the particular user as possible. The identifying information may include, for example, a name, age, gender, or other classifying information associated with a user, an image or biometric data (e.g., voice recording, finger print, etc.) of the user, or one or more administrative or legal credentials of a user, for example, a driver's license number or image of a user's driver's license or other identification card. In some embodiments, the identifying information may be stored in the profile module 114. The user preference packets and other identifying information (e.g., the user ID) may be stored in an app on the device 104 and may be accessible by a user selecting the app using, for example, the interactive display 105.

At step 306, the controller 106 may determine whether the user ID of the user preference packets matches a user ID of the user profile to be loaded. For example, the user ID associated with the group of user preference packets may be compared to the user ID of the user profile to be loaded that is determined based on the device identification discussed above. If the user ID of the user preference packets matches the user ID of the user profile to be loaded, the controller may not discard the user preference packets.

At step 308, the controller 106 may store the user preference packets in a temporary storage in response to determining that the user ID of the user preference packets does not match with the user ID of the user profile to be loaded. The temporary storage may be, for example, a cache or other drive on one of the memory modules of the controller 106 or in the network 110. The temporary storage may allow the user preference packets to be quickly reloaded if it is later determined that a user ID of the user preference packets matches the user ID of the user profile to be loaded. For example, if it is determined that a user ID of the user preference packets does not match the user ID of the user profile to be loaded, the user preference packets may not be deleted completely, but instead stored in the temporary cache in case it is later determined that the user ID of the user profile to be loaded does in fact match the user ID of the user preference packets. In some embodiments, the temporary storage or cache may be cleared by an action of one or more users of the system. For example, a user may utilize a graphical user interface (GUI) on a heads-up display (HUD) of the head unit of the vehicle 102 with one or more coded instructions that enable the user to clear the temporary storage.

At step 310, the controller 106 may discard the user preference packets in the temporary storage based on not matching a user ID of the preference packets with a user ID of a user profile with a specified time frame. For example, if the user ID of the preference packets is not matched with a user ID of a user profile within 5 seconds, the user preference packets may be discarded (i.e., the specified time frame is 5 seconds). In other embodiments, the specified time frame may be longer or shorter (e.g., 1 second, 10 seconds, 60 seconds, etc.).

Figure 4:
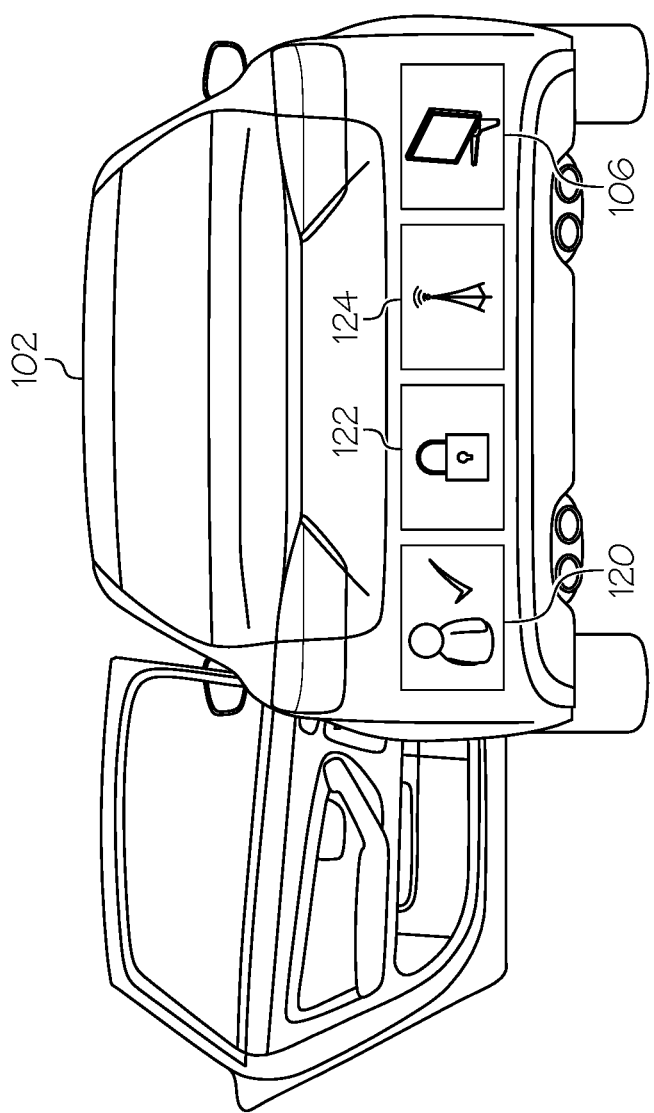
FIG. 4 depicts a particular embodiment of the method of FIG. 2, according to one or more embodiments shown and described herein.
Figure 4:
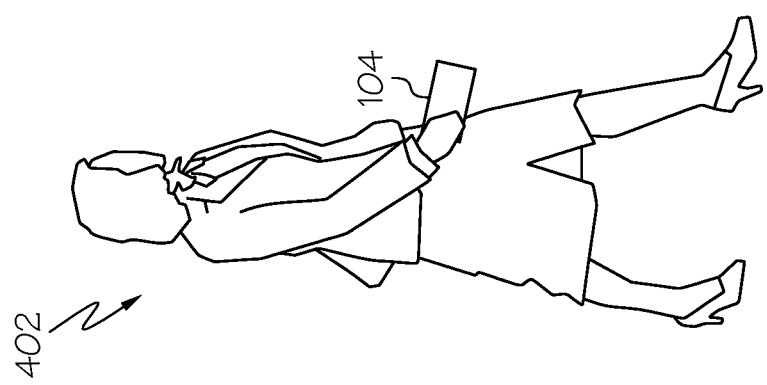

Referring now to FIGS. 1 and 4, a particular example scenario for using an embodiment of the system 100 for correcting a mismatched user profile is shown. In FIG. 4, a user 402 is shown entering the vehicle 102. The vehicle 102 includes components of the system 100 of FIG. 1. The vehicle 102 includes a controller 106, which includes the encryption/decryption module 122, the profile module 120, and network interface hardware 124. The user 402 carries the device 104. In this scenario, the device 104 is the usual device of the user 402. However, the spouse (not pictured) of the user 402 has recently used the device 104 and during the spouse's use, he logged into the profile module 114 of the device 104 with his own profile such that the user preference packets associated with the spouse are uploaded to the device 104. Further, the user 402 has not re-associated her own profile with the profile module 114 since re-taking possession of her own device 104 (i.e., the spouse is still logged into the device 104). Accordingly, while the user 402 is in possession of her normal device as she enters the vehicle 102, the user profile logged into the profile module 114 of the device 104 is not the user profile normally associated with the device 104.

As the user 402 approaches the vehicle 102 while carrying the device 104, the controller 106 may recognize the device 104 as the device of the user 402. The device 104 may be recognized using a Bluetooth communication protocol, for example, an HFP, an SPP protocol, or a BLE protocol and the device 104 may be automatically recognized when within a certain proximity of the vehicle 102. Accordingly, the controller 106 may identify the profile of the user as the profile to be loaded based on the detection of the device 104. The controller 106 may cue the profile of the user 402 to be loaded.

Additionally, the controller 106 may receive one or more user preference packets from the device 104. The user preference packets may be stored, for example, in the profile module 114 of the device 104, which may be embodied as an executable application (app) stored in the device 104. In some embodiments, data associated with or stored in the user preference packets may be encrypted. For example, the device 104 may encrypt the data associated with the user preference packets before it is sent to the vehicle 102 using the encryption/decryption module 116. The controller 106 may decrypt the received data using the encryption/decryption module 122.

The user preference packets may be associated with a user ID. In this case, the user preference packets may be associated with the user ID of the spouse of the user 402 (rather than the user herself) because the spouse has logged into the app on the device 104 with his own profile. Accordingly, there may be a mismatch between the user ID that is recognized by the vehicle 102 based on the Bluetooth signal received from the device 104 and the user ID associated with the user preference packets stored in the profile module 114.

The controller 106 may determine whether the user ID of the user preference packets matches with a user ID of the user profile to be loaded, for example, by comparing the two user IDs. If the user IDs do not match, the controller may discard the user preference packets in response to determining that the user ID of the user preference packets does not match with the user ID of the user profile to be loaded. In some embodiments, the head unit may apply other logic such as Bluetooth address match before it discards the user preference packets. Accordingly, the vehicle 102 may not alter the internal and other settings of the vehicle to match the settings preferred by the spouse. For example, the system 100 may not cause one or more subscription services that may be associated with the profile to be loaded to the head unit of the vehicle 102, such that the vehicle 102 cannot access subscription services of a user without his or her authorization.

In some embodiments, the vehicle may alter the settings of the vehicle to match default user settings based on mismatched user profiles. For example, the vehicle may adjust a driver's seat position to a default position based on mismatched user profiles.

It should now be understood that a vehicle may include a controller capable of detecting a device based on one or more signals from the device and may be capable of associating the device with a particular user ID in order to recognize the device. A recognized device may store one or more user preference packets associated with a user ID in a user profile module or other app of the device. When the vehicle recognizes the device ID based on a Bluetooth or other distinctive signal of the device and associates the device ID with a user ID, but the user ID associated with the device does not match a user ID loaded from user preference packets associated with the device, the vehicle may discard the user preference packets loaded from the device and thus not load user preferences based on an incorrectly loaded user ID. This may save the user of the vehicle time and effort, trying to reset vehicle settings to his or her preferred settings.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle system for a vehicle comprising:
a controller configured to:
obtain device information of a user device carried by a signal transmitted from the user device;
identify a user profile stored in the controller and associated with the device information;
receive user preference packets containing a user ID from an app of the user device, the app of the user device storing the user ID;
determine whether the user ID contained in the user preference packets matches with a user ID of the user profile associated with the device information;
store the user preference packets in a temporary storage in response to determining that the user ID contained in the user preference packets does not match with the user ID of the user profile associated with the device information; and
discard the user preference packets in the temporary storage a predetermined time after determining that the user ID contained in the user preference packets does not match with the user ID of the user profile associated with the device information.

2. The vehicle system of claim 1, wherein the user preference packets comprise one or more settings preferred by a user associated with one or more components of the vehicle.

3. The vehicle system of claim 1, wherein the user preference packets are encrypted.

4. The vehicle system of claim 1, wherein the signal is transmitted from the user device via Bluetooth Low Energy communication.

5. The vehicle system of claim 1, wherein the signal is transmitted from the user device via Bluetooth Serial Port Profile communication.

6. The vehicle system of claim 1, the controller further configured to:
generate default user preference packets in response to discarding the user preference packets received from the user device; and
associate the default user preference packets with the user profile to be loaded.

7. The vehicle system of claim 6, wherein the default user preference packets comprise one or more settings associated with one or more components of the vehicle.

8. The vehicle system of claim 1, the controller further configured to:
load the user profile to be loaded with one or more default user preference packets; and
update a profile log based on the user profile that was loaded.

9. The vehicle system of claim 8, the controller further configured to:
receive one or more settings associated with one or more components of the vehicle; and save the one or more settings associated with one or more components of the vehicle as user preference packets of the user profile that was loaded.

10. The vehicle system of claim 9, the controller further configured to:
send the one or more settings associated with one or more components of the vehicle to the user device.

11. The vehicle system of claim 1, the controller further configured to:
generate a signal with a private key or a session key that creates an encrypted signal that is decrypted using an associated public key.

12. The vehicle system of claim 1, the controller further configured to:
apply a hash function to a signal; and
sign a resulting hash.

13. A method comprising:
obtaining device information of a user device carried by a signal transmitted from the user device;
identifying a user profile stored in a controller of a vehicle and associated with the device information;
receiving user preference packets containing a user ID from an app of the user device, the app of the user device storing the user ID;
determining whether the user ID contained in the user preference packets matches with a user ID of the user profile to be loaded;
storing the user preference packets in a temporary storage in response to determining that the user ID contained in the user preference packets does not match with the user ID of the user profile associated with the device information; and
discarding the user preference packets in the temporary storage a predetermined time after determining that the user ID contained in the user preference packets does not match with the user ID of the user profile associated with the device information.

14. The method of claim 13, further comprising:
generating default user preference packets in response to discarding the user preference packets received from the user device; and
associating the default user preference packets with the user profile to be loaded.

15. The method of claim 14, further comprising:
loading the user profile to be loaded with one or more default user preference packets; and
updating a profile log based on the user profile that was loaded.

16. The method of claim 15, further comprising:
receiving one or more settings associated with one or more components of the vehicle;
saving the one or more settings associated with one or more components of the vehicle as user preference packets of the user profile that was loaded.

17. The method of claim 13, wherein the user preference packets are encrypted.

18. The method of claim 13, wherein the signal is transmitted from the user device via Bluetooth Low Energy communication.

19. The method of claim 13, wherein the signal is transmitted from the user device via Bluetooth Serial Port Profile communication.

20. A non-transitory computer-readable medium storing programs that, when executed by a controller, cause the controller to:
obtain device information of a user device carried by a signal transmitted from the user device;

identify a user profile stored in the controller and associated with the device information;
receive one or more user preference packets containing a user ID from an app of the user device, the app of the user device storing the user ID;
determine whether the user ID contained in the user preference packets matches with a user ID of the user profile associated with the device information;
store the user preference packets in a temporary storage in response to determining that the user ID contained in the user preference packets does not match with the user ID of the user profile associated with the device information; and
discard the user preference packets in the temporary storage a predetermined time after determining that the user ID contained in the user preference packets does not match with the user ID of the user profile associated with the device information.

\* \* \* \* \*

UNITED STATES PATENT AND TRADEMARK OFFICE
CERTIFICATE OF CORRECTION

| | | |
|---|---|---|
| PATENT NO. | : 12,311,855 B2 | Page 1 of 1 |
| APPLICATION NO. | : 17/161750 | |
| DATED | : May 27, 2025 | |
| INVENTOR(S) | : Anil Nagpal et al. | |

It is certified that error appears in the above-identified patent and that said Letters Patent is hereby corrected as shown below:

On the Title Page

Item (71), applicant 2, city, delete "Toyota Aichi-ken" and insert --Toyota-shi Aichi-ken--, therefor.

Item (72), inventor 4, city, delete "Toyota" and insert --Toyota-shi Aichi-ken--, therefor.

Item (72), inventor 5, city, delete "Toyota" and insert --Toyota-shi Aichi-ken--, therefor.

Item (73), assignee 2, city, delete "Toyota" and insert --Toyota-shi Aichi-ken--, therefor.

In the Specification

In Column 2, Line(s) 59, delete "("HFP")" and insert --(HFP)--, therefor.

Signed and Sealed this
Fifteenth Day of July, 2025

Coke Morgan Stewart
*Acting Director of the United States Patent and Trademark Office*